(12) United States Patent  (10) Patent No.: US 9,209,924 B2
Borowski  (45) Date of Patent: Dec. 8, 2015

(54) DETECTING A PERIODIC TIMING REFERENCE IN A RECEIVED SIGNAL

(71) Applicant: Research In Motion Limited, Waterloo (CA)

(72) Inventor: Peter Anthony Borowski, Cambridge (GB)

(73) Assignee: BlackBerry Limited, Waterloo, Ontario (CA)

( * ) Notice: Subject to any disclaimer, the term of this patent is extended or adjusted under 35 U.S.C. 154(b) by 51 days.

(21) Appl. No.: 13/667,866

(22) Filed: Nov. 2, 2012

(65) Prior Publication Data

US 2014/0125400 A1    May 8, 2014

(51) Int. Cl.
*H03D 1/00* (2006.01)
*H04J 11/00* (2006.01)
*H04L 27/26* (2006.01)

(52) U.S. Cl.
CPC ......... *H04J 11/0073* (2013.01); *H04L 27/2656* (2013.01); *H04L 27/2675* (2013.01); *H04L 27/2688* (2013.01)

(58) Field of Classification Search
None
See application file for complete search history.

(56) References Cited

U.S. PATENT DOCUMENTS

| 4,164,036 A * | 8/1979 | Wax ................................ 702/74 |
| 8,396,097 B1 * | 3/2013 | Giallorenzi et al. .......... 375/150 |
| 2013/0064328 A1 * | 3/2013 | Adnani et al. ................. 375/340 |
| 2013/0294343 A1 * | 11/2013 | Akita et al. .................... 370/328 |

* cited by examiner

*Primary Examiner* — Adolf Dsouza
(74) *Attorney, Agent, or Firm* — Jeffrey N. Giunta; Fleit Gibbons Gutman Bongini & Bianco P.L.

(57) ABSTRACT

An apparatus for detecting a periodic timing reference in a received signal comprises a correlator and an integrator. The correlator is configured to correlate the received signal with a template to produce a correlated signal indicating the presence of the periodic timing reference in the received signal. The integrator is configured to produce an accumulated signal by overlaying one or more delayed versions of the accumulated signal onto the correlated signal, and is further configured to delay the accumulated signals by integer multiples L of a period of the periodic timing reference, the integer multiples L being at least two.

19 Claims, 8 Drawing Sheets

DETECTING A PERIODIC TIMING REFERENCE IN A RECEIVED SIGNAL

TECHNICAL FIELD

The present disclosure relates to an apparatus, system and method for detecting a periodic timing reference in a received signal.

BACKGROUND

According to the Long Term Evolution (LTE) standard, a cell search process is carried out whereby a receiver synchronizes with a cell. The cell broadcasts a primary synchronization signal (PSS) used for timing and frequency acquisition and a secondary synchronization signal (SSS) used to acquire information related to the cell. Each of the PSS and SSS constitutes a period timing reference which is repeated every 5 ms.

Figure 1:
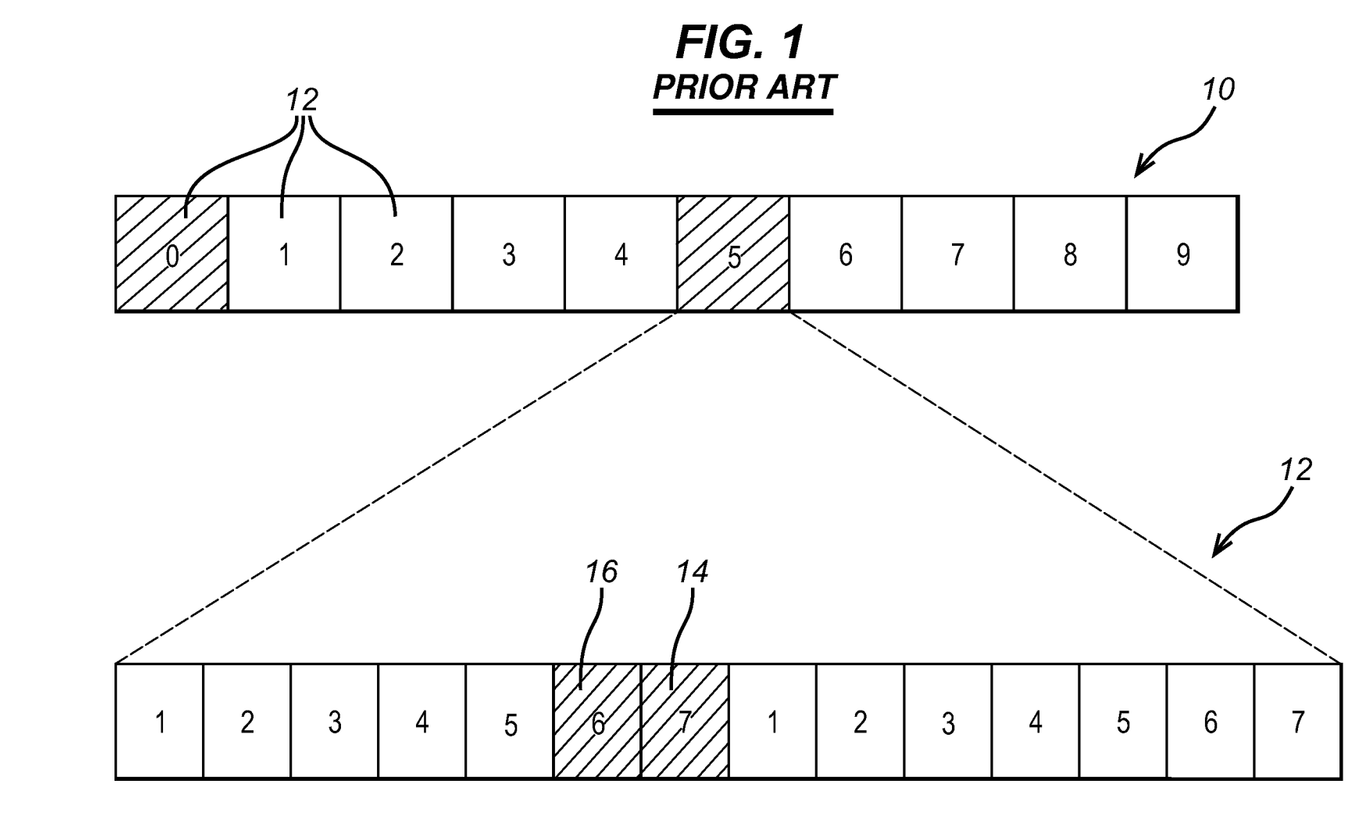
FIG. 1 is a block diagram of an LTE downlink radio frame.

FIG. 1 shows the structure of an LTE downlink radio frame 10. The 10 ms radio frame 10 is divided into ten 1 ms sub-frames 12, with each sub-frame 12 being split into 0.5 ms slots, each slot containing seven symbols. In an FDD cell, as shown in FIG. 1, the PSS 14 is transmitted as the last symbol of the first and eleventh slots of the frame 10, and the SSS is transmitted as the preceding symbol. In a TDD cell (not shown), the PSS is transmitted as the third symbol of the third and thirteenth slots, with the SSS being transmitted three symbols earlier. Thus, whether the cell uses FDD or TDD, the PSS and SSS each appear in the same position during each half radio frame, thereby being transmitted every 5 ms.

DRAWINGS

A description will now be given with reference to the accompanying drawings, in which.

DESCRIPTION

A description will now be given with reference to one or more particular examples which are not intended to be limiting on the scope of the invention.

According to a first aspect, there is provided an apparatus for detecting a periodic timing reference in a received signal, the apparatus comprising a correlator configured to correlate the received signal with a template to produce a correlated signal indicating the presence of the periodic timing reference in the received signal, and an integrator configured to produce an accumulated signal by overlaying one or more delayed versions of the accumulated signal onto the correlated signal, wherein the integrator is configured to delay the accumulated signals by integer multiples L of a period of the periodic timing reference, the integer multiples L being at least two (L>=2).

With integer multiples of at least two, the integrator omits from a feedback path a signal which is delayed by the period of the periodic timing reference (L≠1). By omitting this signal, the output of the integrator is recognisably different for a received signal including the periodic timing reference compared to a received signal including only a noise spike. In particular, the noise spike results in an accumulated signal which includes spikes or a noticeable magnitude difference, whereas the periodic timing reference results in the accumulated signal having a flatter peak profile. Further circuitry may look to the peak profile of the accumulated signal to recognise the presence or otherwise of the periodic timing reference. Omitting from the feedback path the signal which is delayed by the period of the periodic timing reference may involve taps being separated from each other by the integer multiples of at least two. Any multiple of the period other than one may be used. However, higher multiples may degrade sensitivity and would require more memory. In one implementation, the integrator comprises a delay line having a single tap which delays the accumulated signal by the integer multiple of the period of the periodic timing reference. In a more particular implementation, the integer multiple of the single tap is two (L=2).

Thus, the apparatus mitigates false positives. A real cell will produce a peak in the accumulated signal every time the period of the timing reference elapses, whereas a noise spike will produce a peak which recurs no more frequently than two times the period. For example, in one implementation, the timing reference is transmitted periodically every 5 ms, and the delay is 10 ms. A noise spike will produce a peak every 10 ms, whereas a real cell produces a peak every 5 ms.

"Detecting a periodic timing reference" may refer to a process which occurs during LTE cell detection and synchronization. However, it is to be understood that the apparatus finds applications outside of LTE, in any communications system which uses a periodic reference signal to allow remote parties to obtain timing synchronisation, such as LTE advanced, 3G, and cable modems, amongst others. In the case of asynchronous communications (including WiFi and UWB, for example) the periodic timing reference may be the 'preamble', where the initial section of the preamble is periodic to allow reduced-complexity receiver implementation (for a given performance objective). Even in this scenario the apparatus may offer a performance gain. The process may also involve extracting information from the reference such as a cell ID. The periodic timing reference may be any signal which serves to establish a timing reference, for example a synchronization signal, e.g. the primary synchronization signal (PSS) of LTE.

The correlator may be any device, for example a matched filter, which correlates the received signal (e.g. a signal from a mixer) with the template or a reference signal to result in the correlated signal or correlation data. Thus, owing to the auto-correlation properties of the timing reference, the correlated signal includes a peak or spike each time the timing reference occurs in the received signal.

The integrator may be any device configured to feedback or overlay delayed signals onto an incoming signal in order to accumulate the signals, and may be referred to as an accumulator. In one example, the integrator may comprise an IIR filter, which may be a sparse-tap IIR filter. By "sparse-tap" is meant a feedback arrangement in which one or more coefficients are zero. In one example, the sparse-tap arrangement may comprise a zero tap coefficient for a delay line which delays the delayed accumulated signal by the period of the periodic timing reference. Additionally or alternatively, the integrator may comprise programmable coefficients.

The apparatus may comprise a timing detector configured to receive the accumulated signal from the integrator and to indicate timing acquisition or no timing acquisition on the basis of a peak profile of the accumulated signal. The timing detector may comprise one or more of a peak detector and decision logic.

The timing detector may be configured to separate peaks in the accumulated signal into a plurality of subsets S numbered $0 \ldots L-1$, wherein the peaks which form part of the S'th subset are at offsets $(n*L+S)*P+K$, where n and S are integers and K is an unknown in the range $[0 \ldots P)$, to maintain a count of the number of peaks in each subset whose magnitude exceeds a magnitude threshold, and to indicate timing acquisition only in response to each of the counts exceeding a count threshold. The timing detector may not indicate timing acquisition if only one or some of the counts exceeds the count threshold.

In the case that $L=2$, the timing detector may be configured to allocate to a first subset those peaks which occur at offsets corresponding to $S=0$, and to allocate to a second subset those peaks which occur at offsets corresponding to $S=1$. Thus, maintaining an even/odd count and only indicating timing acquisition when both of the first and second counts exceeds a threshold provides a simple and robust detection method, since it is unlikely that a spike will reoccur at the period of the timing reference.

The timing detector may be configured to combine a plurality of peaks in the accumulated signal to produce a joint-decision metric. Assuming $e0=E(S=0)$ and $e1=E(S=1)$ represent the energy at segment 0 and 1 respectively (for $L=2$), a single joint-decision may use $F(e0, e1)>$Joint-Threshold. $F(e0, e1)$ could be (for example) simply $e0*e1$, or $(e0-Ns)*(e1-Ns)$, where Ns is the estimated noise energy present. In one example, the timing detector may be configured to indicate timing acquisition in response to the magnitude of each peak in the joint-decision metric exceeding a dynamic threshold. In another example, the timing detector may be configured to indicate timing acquisition in response to a non-linear combination of the magnitudes of the peaks in the joint-decision metric exceeding a dynamic threshold.

The integrator may be configured to scale at least one of the delayed versions of the accumulated signal before overlaying onto the correlated signal, and to produce the accumulated signal for a predetermined initial period of time without decay before introducing a scaling operation. For example, in one implementation, in which the period is 5 ms and the delay 10 ms, the integrator accumulates for the first 50 ms without decay, which produces a reliable indication. The decay switches in after 50 ms, to avoid timing drift.

According to a second aspect, there is provided a system comprising the apparatus of the first aspect, and a cell-search classification engine configured to respond to an indication of timing acquisition.

According to a third aspect, there is provided a method of detecting a periodic timing reference in a received signal, the method comprising correlating the received signal with a template to produce a correlated signal indicating the presence of the periodic timing reference in the received signal, and producing an accumulated signal by overlaying one or more delayed versions of the accumulated signal onto the correlated signal, wherein the accumulated signals are delayed by integer multiples L of a period of the periodic timing reference, the integer multiples L being at least two.

The method may comprise using a delay line having a single tap to delay the accumulated signal by the integer multiple of the period of the periodic timing reference.

The integer multiple may be two.

The method may comprise a timing detector receiving the accumulated signal from the integrator and indicating timing acquisition or no timing acquisition on the basis of a peak profile of the accumulated signal.

The method may comprise the timing detector separating peaks in the accumulated signal into a plurality of subsets S numbered $0 \ldots L-1$, wherein the peaks which form part of the S'th subset are at offsets $(n*L+S)*P+K$, where n and S are integers and K is an unknown in the range $[0 \ldots P)$, to maintain a count of the number of peaks in each subset whose magnitude exceeds a magnitude threshold, and indicating timing acquisition only in response to each of the counts exceeding a count threshold.

The method may comprise the timing detector allocating to a first subset those peaks which occur at offsets corresponding to $S=0$, and allocating to a second subset those peaks which occur at offsets corresponding to $S=1$.

The method may comprise the timing detector combining a plurality of peaks in the accumulated signal to produce a joint-decision metric.

The method may comprise the timing detector indicating timing acquisition in response to the magnitude of each peak in the joint-decision metric exceeding a dynamic threshold.

The method may comprise the timing detector indicating timing acquisition in response to a non-linear combination of the magnitudes of the peaks in the joint-decision metric exceeding a dynamic threshold.

The method may comprise producing the accumulated signal using an IIR filter.

The method may comprise scaling at least one of the delayed versions of the accumulated signal before overlaying onto the correlated signal, and producing the accumulated signal for a predetermined initial period of time without decay before introducing a scaling operation.

The method may comprise using an integrator having programmable coefficients.

According to a fourth aspect, there is provided a computer program product storing computer-executable instructions which, when executed by a processor, cause the processor to perform the method of the third aspect.

Figure 2:
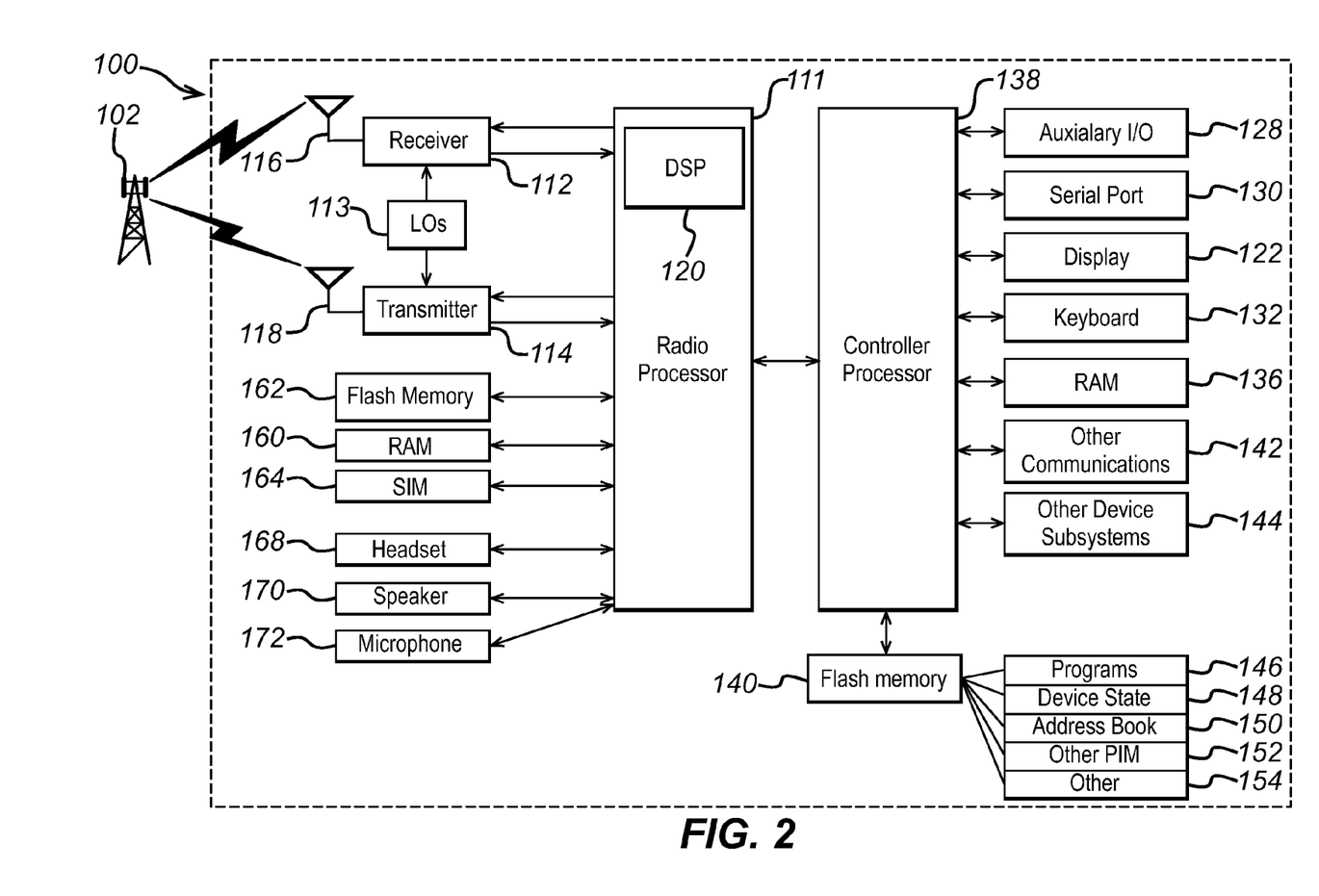
FIG. 2 is a block diagram of wireless mobile device.

FIG. 2 is a block diagram of a wireless mobile device 100 incorporating a communication subsystem having both a receiver 112 and a transmitter 114, as well as associated components such as one or more embedded or internal antenna elements 116 and 118, local oscillators (LOs) 113, and a processing module such as a digital signal processor (DSP) 120. The particular design of the communication subsystem will be dependent upon the communication network in which the device is intended to operate such as in a 3GPP LTE network.

The wireless mobile device 100 performs synchronization, registration or activation procedures by sending and receiving communication signals over the network 102. Uplink (UL) signals received by antenna 116 through communication network 100 are input to receiver 112, which may perform such common receiver functions as signal amplification, frequency down conversion, filtering, channel selection and the like, and in the example system shown in FIG. 2, analog-to-digital (A/D) conversion. A/D conversion of a received signal allows more complex communication functions such as demodulation, decoding and synchronization to be performed in the DSP 120.

In a similar manner, signals to be transmitted are processed, including modulation and encoding for example, by DSP 120 and input to transmitter 114 for digital to analog conversion, frequency up conversion, filtering, amplification and transmission over the communication network 102 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Wireless device 100 preferably includes a radio processor 111 and a control processor 138 which together control the overall operation of the device. DSP 120 is located on radio processor 111. Communication functions are performed through radio processor 111.

Radio processor 111 interacts with receiver 112 and transmitter 114, and further with flash memory 162, random access memory (RAM) 160, the subscriber identity module 164, a headset 168, a speaker 170, and a microphone 172.

Microprocessor 138 interacts with further device subsystems such as the display 122, flash memory 140, random access memory (RAM) 136, auxiliary input/output (I/O) subsystems 128, serial port 130, keyboard 132, other communications 142 and other device subsystems generally designated as 144.

Some of the subsystems shown in FIG. 2 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Software used by radio processor 111 and microprocessor 138 is preferably stored in a persistent store such as flash memory 140 and 162, which may instead be a read-only memory (ROM) or similar storage element (not shown). The operating system, specific device applications, or parts thereof, may be temporarily loaded into a volatile memory such as RAM 136 and RAM 260. Received communication signals may also be stored in RAM 136.

As shown, flash memory 140 can be segregated into different areas for computer programs 146, device state 148, address book 150, other personal information management (PIM) 152 and other functionality generally designated as 154. These different storage types indicate that each program can allocate a portion of flash memory 140 for their own data storage requirements. Control processor 138, in addition to its operating system functions, preferably enables execution of software applications on the mobile station.

For voice communications, overall operation of wireless mobile device 100 is similar, except that received signals would preferably be output to the speaker 170 or headset 168 and signals for transmission would be generated by the microphone 172. Alternative voice or audio I/O subsystems, such as a voice message recording subsystem, may also be implemented on mobile station 102.

Serial port 130 in FIG. 2 would normally be implemented in a wireless mobile device that have PDA functionality for which synchronization with a user's desktop computer (not shown) may be desirable, but is an optional device component. Such a port 130 would enable a user to set preferences through an external device or software application and would extend the capabilities of wireless mobile device 100 by providing for information or software downloads to wireless mobile device 100 other than through a wireless communication network. The alternate download path may for example be used to load an encryption key onto the device through a direct and thus reliable and trusted connection to thereby enable secure device communication.

Other device subsystems 144, such as a short-range communications subsystem, is a further optional component which may provide for communication between wireless mobile device 100 and different systems or devices, which need not necessarily be similar devices. For example, the subsystem 144 may include an infrared device and associated circuits and components or a Bluetooth™ communication module to provide for communication with similarly enabled systems and devices.

Figure 3:
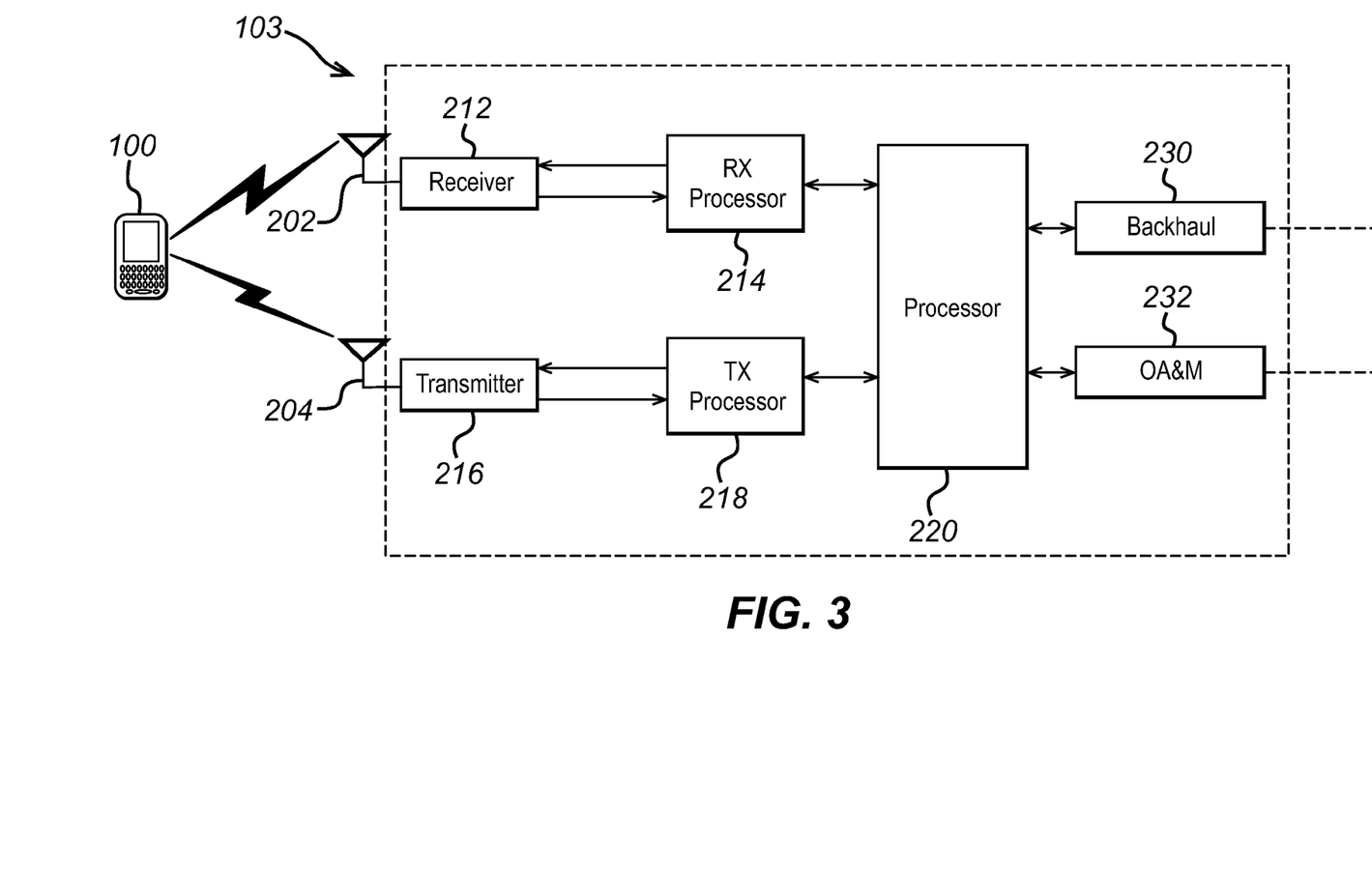
FIG. 3 is a block diagram of a wireless base station.

FIG. 3 is a block diagram of wireless base station 103 connected to wireless network 102. The wireless base station 103 communicates with a plurality of wireless mobile devices located in the service region. A receiver 212 is coupled to one or more receive antennas 202 for processing signals from the wireless mobile devices. Downlink (DL) signals from wireless mobile devices are received by antenna 202 are input to receiver 212, which may perform common receiver functions as signal amplification, frequency down conversion, filtering, channel selection and analog to digital (A/D) conversion. A/D conversion of a received signal allows more complex communication functions such as demodulation, decoding and synchronization to be performed in the receive processor 214. In the transmission path, one or more transmit antennas 204 are coupled to a transmitter 216. The transmitter 216 provides frequency up-conversion including modulation, amplification and transmission over the communication to wireless mobile device 100. Digital to analog conversion and encoding can be performed by transmit processor 218. The processor 220 provides additional processing of the received and transmitted signals and interfaces with backhaul interfaces 230 and OA & M 232 interfaces with the rest of the wireless network 102 for operation of the BTS 103. The receive processor 214 may additional perform timing synchronization on signals received from wireless mobile devices 100 on the wireless network 102.

Figure 4:
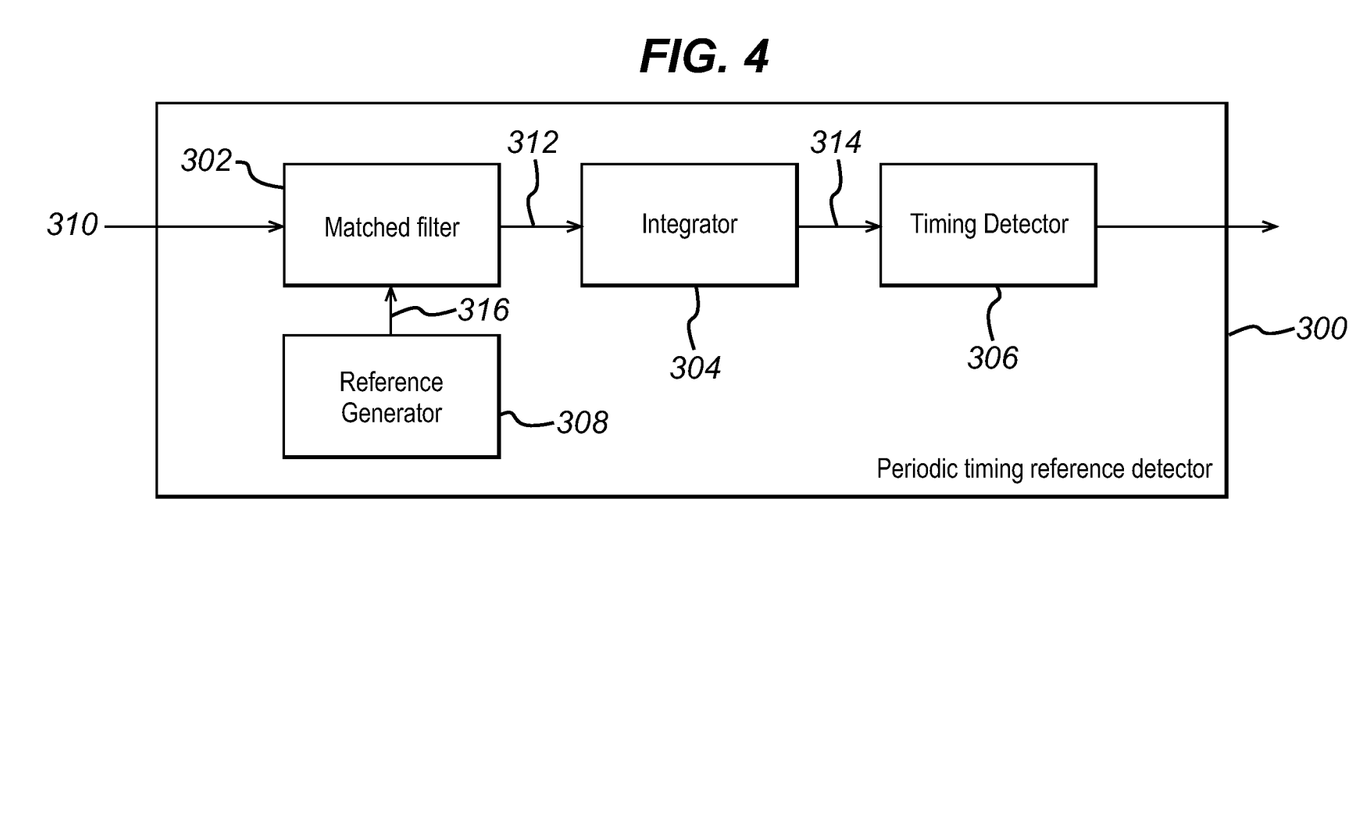
FIG. 4 is a block diagram of a periodic timing reference detector.

FIG. 4 is a block diagram of a periodic timing reference detector 300 according to one implementation.

The detector 300 comprises a correlator 302, which in this example is a matched filter, an integrator 304, a timing detector 306, and a reference generator 308.

The matched filter 302 correlates a received signal 310 with a template 316 provided by the reference generator 308 to produce a correlated signal 312 indicating the presence of the periodic timing reference in the received signal. In this example, the periodic timing reference is the primary synchronization signal (PSS) of LTE, having a period of 5 ms.

The integrator 304 produces an accumulated signal 314 by overlaying one or more delayed versions of the accumulated signal 314 onto the correlated signal 312. The integrator 304 delays the accumulated signals 314 by integer multiples of the period of the periodic timing reference, the integer multiples being at least two.

Figure 5:
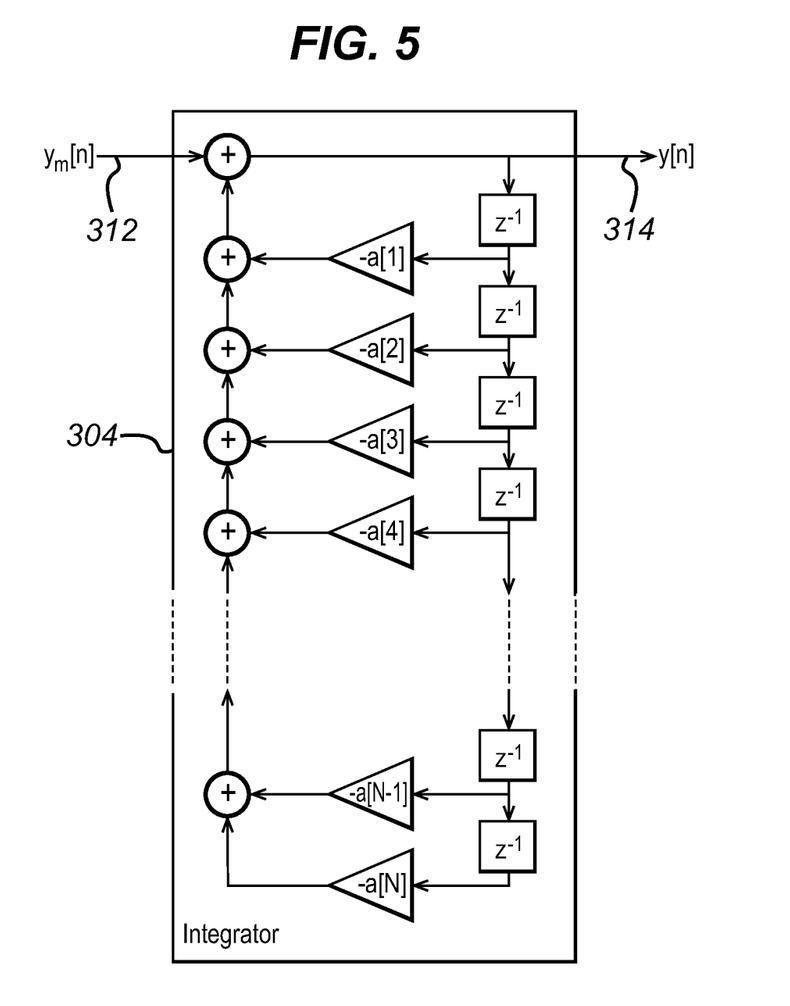
FIG. 5 is a block diagram of a general integrator.

FIG. 5 is a block diagram showing a typical integrator, which delays and scales versions of the accumulated signal 314 before overlaying them onto the correlated signal 312.

Figure 6:
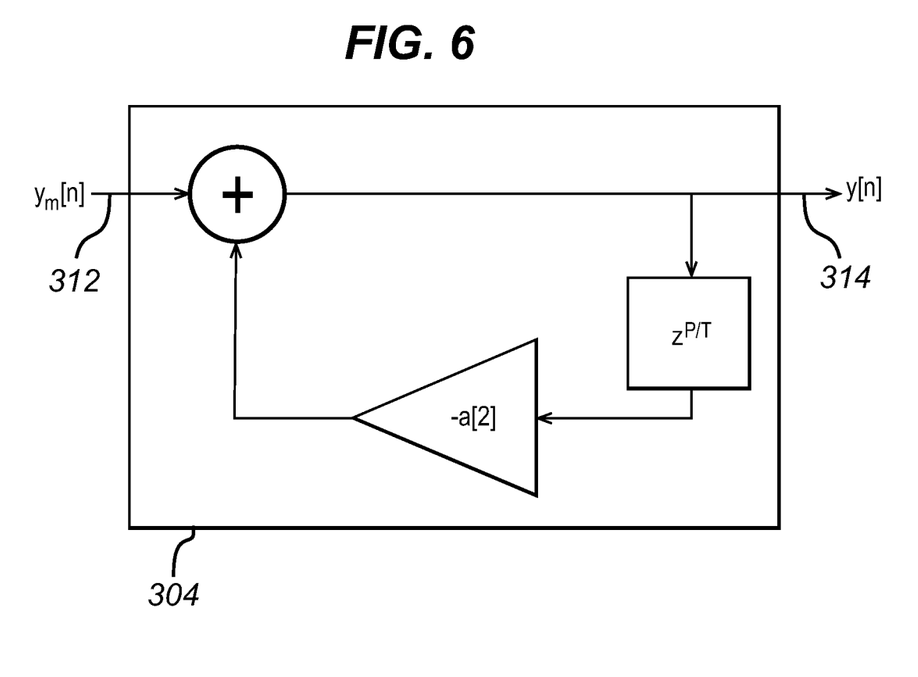
FIG. 6 is a block diagram of an integrator according to one particular implementation.

FIG. 6 illustrates the integrator 304 of this implementation, in which all terms in the delay line are zero except one required to achieve a feedback delay of L*P, e.g. 10 ms in the case of P=5 ms, L=2. For an input sample rate T, the terms $z^{-1}$ of FIG. 5 are replaced by $z^{(P/T)}$. In one example, if T were 16 Ts (1.92 Msps), and P were 153600 Ts (5 ms), then P/T=9600, which is suitable for an LTE modem. Then, in the case of L=2, the first-order delay term (=5 ms) a[1] is zero.

The second-order delay term (=10 ms) a[2]=1.0–alpha, where 1/alpha is proportional to the rate of decay. All other delay terms are zero. Thus, in this implementation, there is only one non-zero tap located at the end of the L*9600 delay elements. The integrator 304 is therefore a sparse-tap IIR filter. The integrator output y[n] may be attenuated by a quantity proportional to the reciprocal of the integrator's step response, so as to normalise the output during the operational interval of the integrator.

Figure 7A:
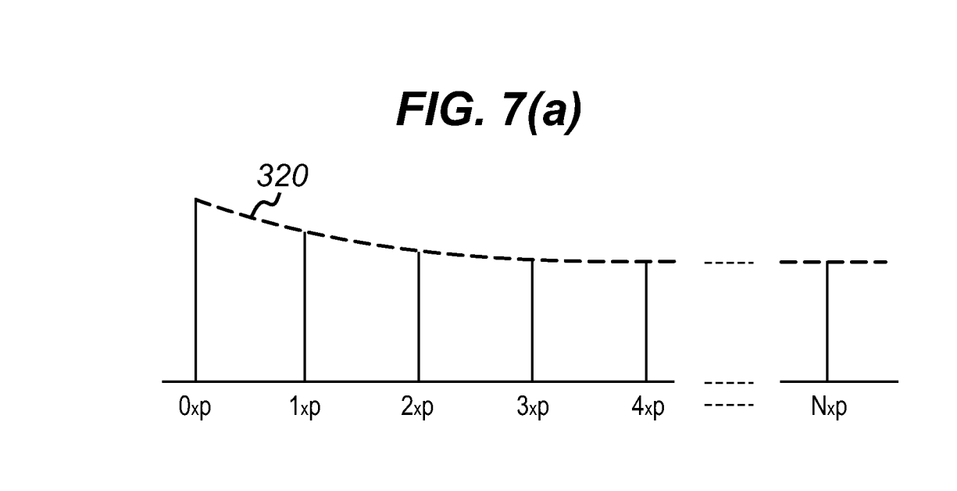
FIGS. 7(a) and 7(b) illustrate accumulated signals output by the integrator of FIG. 6.
Figure 7B:
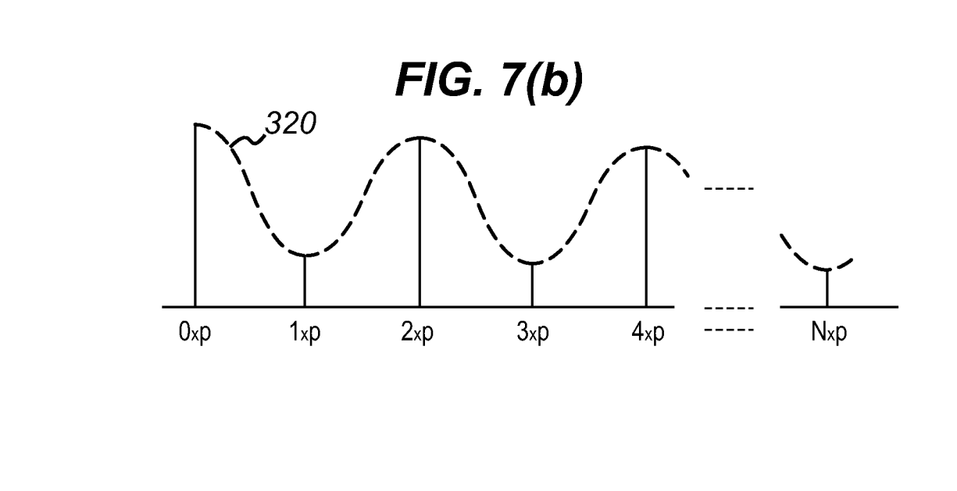

FIGS. 7(a) and 7(b) illustrate the difference in the form of the accumulated signal output by the integrator 304 shown in FIG. 6 in the case that (a) the received signal 310 includes the periodic timing reference, and (b) the received signal 310 includes only a noise spike. As can be seen, the signal envelope 320 for a signal including the periodic timing reference (FIG. 7(a)) is less variable than the signal envelope 320 for a signal which includes only a noise spike (FIG. 7(b)). In FIG. 7(a), the constant periodic input results in output amplitudes which are constant, once steady-state operation has been reached. FIG. 7(b) shows peaks at 2*P and 4*P having a height close to that of the offending noise peak at 0*P, since there is decay of for example 10% (alpha=0.1) over each 2*P interval. Thus, it can be seen in FIG. 7(b) that the peaks at odd-numbered offsets (1*P, 3*P, 5*P, etc.) do not corroborate with those at even-numbered offsets, leading to ready identification of the noise-induced false-peak series. Thus, the detector 300 provides a signal output in which false positives can be readily identified and eliminated by contrasting two unique points of observation.

The timing detector 306 receives the accumulated signal 314 from the integrator 304 and indicates timing acquisition or no timing acquisition on the basis of the peak profile 320 of the accumulated signal 314.

In the example described with reference to FIGS. 6 and 7, the timing detector 306 separates peaks in the accumulated signal 314 into a first subset and a second subset, and maintains a first count of the number of peaks in the first subset whose magnitude exceeds a magnitude threshold, and a second count of the number of peaks in the second subset whose magnitude exceeds the magnitude threshold. The timing detector 306 indicates timing acquisition in response to both of the first and second counts exceeding a count threshold. The timing detector 306 allocates to the first subset those peaks which occur at odd-numbered offsets (1*P, 3*P etc.), and allocates to the second subset those peaks which occur at even-numbered offsets (2*P, 4*P etc.). Comparing the first and second counts to the count threshold allows for a reliable determination to be made as to whether or not the received signal includes the periodic timing reference.

In a further implementation, the integrator 304 produces the accumulated signal 314 for a predetermined initial period of time without decay before switching in the coefficients a[1]–a[N] to introduce a scaling operation. For example, in the case that the period is 5 ms and the delay is 10 ms, the integrator 304 accumulates for the first 50 ms without decay, which switches in after 50 ms to avoid timing drift.

Figure 8:
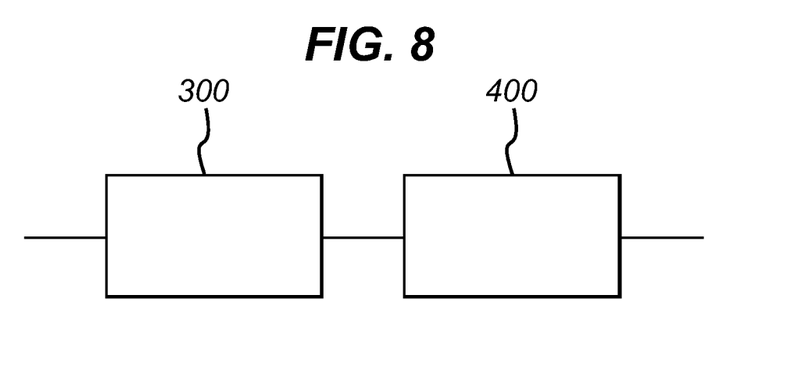
FIG. 8 shows a system comprising the periodic timing reference detector of FIG. 4 and a cell-search classification engine.

FIG. 8 shows a system comprising the periodic timing reference detector 300 and a cell-search classification engine 400 configured to respond to an indication of timing acquisition.

Figure 9:
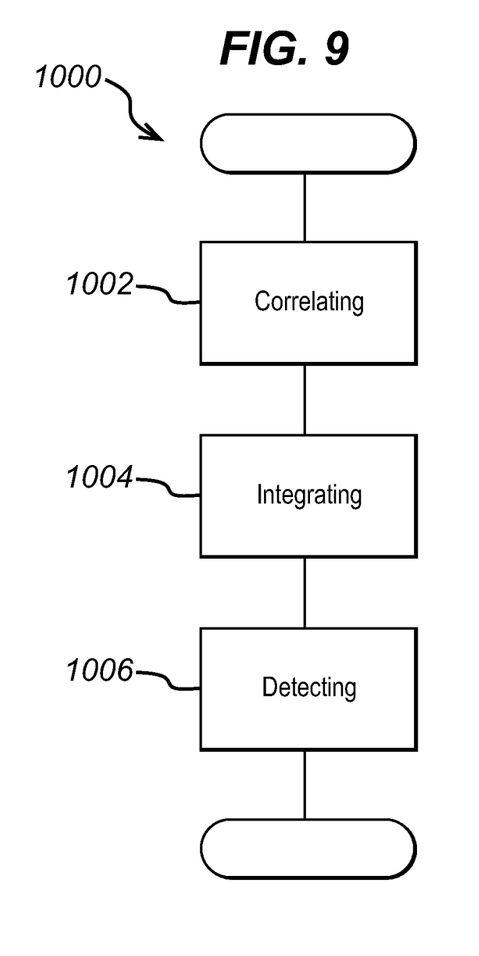
FIG. 9 is a flow diagram illustrating a method of detecting a periodic timing reference.

FIG. 9 shows a method 1000 of detecting a periodic timing reference in a received signal. The method 1000 comprises correlating 1002 the received signal with a template to produce a correlated signal indicating the presence of the periodic timing reference in the received signal, and producing 1004 an accumulated signal by overlaying one or more delayed versions of the accumulated signal onto the correlated signal, wherein the accumulated signals are delayed by integer multiples L of a period of the periodic timing reference, the integer multiples L being at least two. The method optionally includes detecting 1006 timing acquisition or no timing acquisition on the basis of a peak profile of the accumulated signal.

Figure 10:
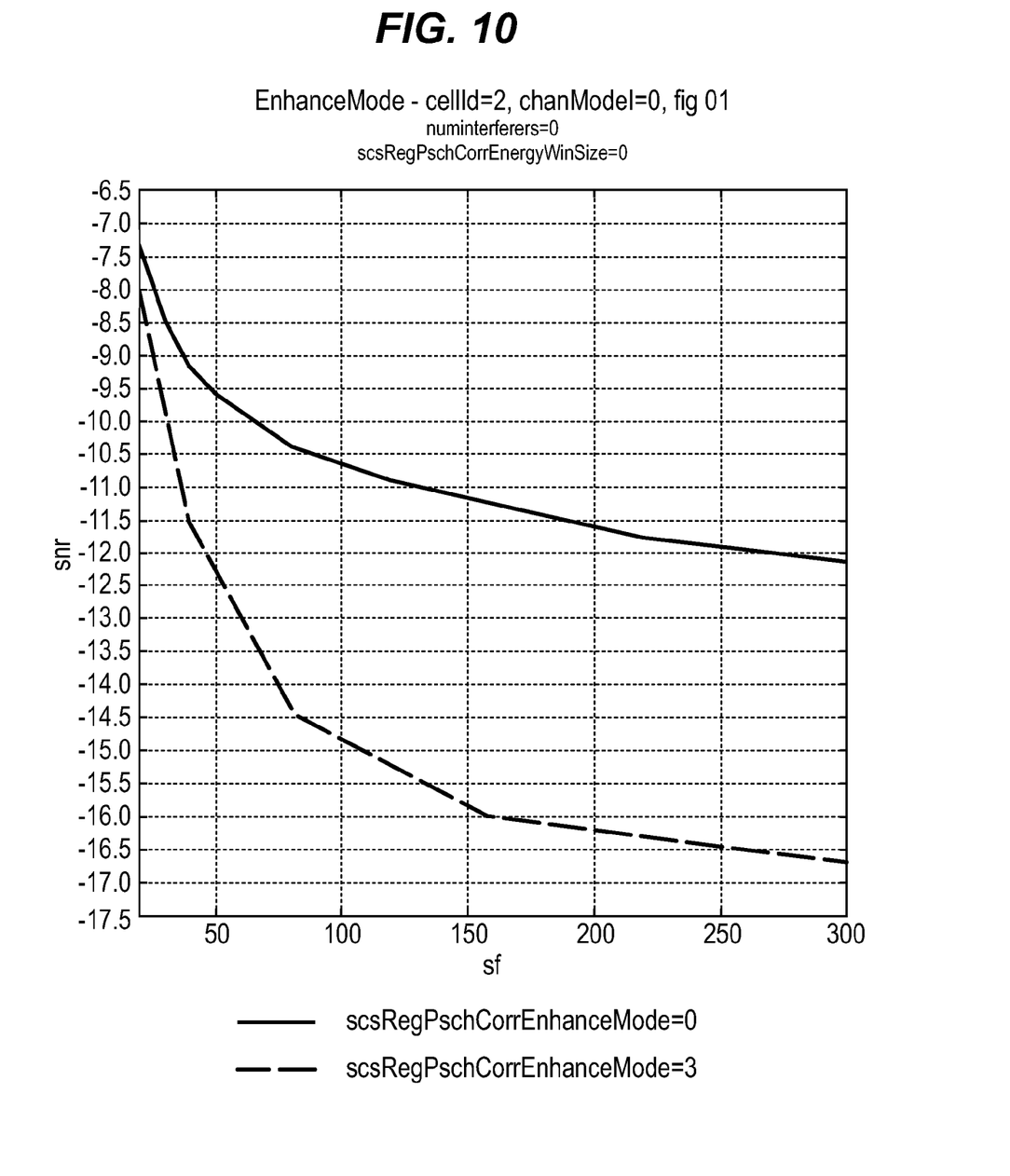
FIG. 10 is a plot of performance with and without the present disclosure.

The present disclosure addresses performance issues in LTE cell detection and synchronisation, though the disclosure can be applied to other synchronous networks such as 3G and LTE-advanced. The disclosure may improve the cell detection sensitivity of a wireless device by around 2.5 dB after 50 ms of detection time, 4.0 dB after 100 ms of detection time, and 4.5 dB after 200 ms of observation time. In an AWGN channel, detection sensitivity with various implementations may be −12.2 dB SNR @50 ms, −14.7 dB SNR @100 ms, −16.2 dB SNR @200 ms, −16.7 dB SNR @300 ms, versus −9.6, −10.6, −11.6, −12.1 dB SNR @50, 100, 200, 300 ms respectively without the disclosure. These figures are a function of other system parameters, in particular the consequential cost of a false-positive during PSCH detection. Thus these figures are typical figures illustrating the benefits achieved assuming a certain false positive performance cost. The LTE conformance specification requires a sensitivity of −6 dB SNR. However, by exceeding this specification, better performance can be achieved by tracking more neighbour cells and thus reducing the number of detector activation duty cycle and associated power consumption. For example, ten simultaneous cells of equal signal level create an environment in which each cell has an SNR of −10 dB. With the present disclosure, the presence of all ten cells can be resolved accurately, whereas a design which only achieves the −6 dB SNR requirement will struggle to resolve more than three coexisting cells. In a real network, the disclosure may provide the advantages of greater cell discovery sensitivity and accuracy, allowing lower power consumption—there would be a reduced need to search for cells continuously, as cells can be detected from a greater distance using the disclosure. FIG. 10 is a plot of performance with/without the disclosure.

The disclosure may enhance the differential between signal and noise energy output by the primary sync correlator by harnessing the periodic nature of the wanted signal (which repeats every 5 ms). One implementation includes a sparse-tap IIR filter, in which taps are 10 ms apart, such that the energy from prior modulo−10 ms measurements is overlaid onto the current measurement. This has the effect of reducing the variance statistic associated with the correlator energy measurement in the presence of the wanted signal, thus improving signal resolution by up to 4.5 dB. The performance of the filter improves as observation time increases. The final performance improvement depends on the filter coefficient design. A programmable coefficient is implemented in one implementation. A 10 ms sparse-tap alignment is used (as opposed to a 5 ms pattern) as this mitigates false-detections due to a noise spike entering the filter. When a noise spike occurs, it will remain in the filter delay line, and be replayed every filter repetition, 10 ms in this case. The cell-search classification engine will not respond to a 10 ms pulse-train, instead looking for a 5 ms pulse-train. So, sensitivity to one-off noise spikes entering the filter may be dramatically reduced. Implementations may use a memory (RAM) to store energy measurements over a 10 ms window. The sample rate applied to the filter may be 480 KHz, requiring 4,800 measurements to be stored to cover 10 ms. The filter design may be IIR, thus allowing the memory size to be limited to a single 10 ms interval whilst still achieving considerable averaging over a much longer interval. For example, with a coefficient a2=0.75 (a decay rate of 0.75), an SNR gain of around 6 dB can be expected to be achieved, in theory, although in practice a gain of 4.5 dB may be achieved after 200 ms.

It will be appreciated that the above disclosure relates to examples only, and that modifications departing from the examples may be applicable within the scope of the invention.

The invention claimed is:

1. An apparatus for detecting a timing reference that occurs periodically in a received signal every P seconds, the apparatus comprising:
a correlator configured to correlate the received signal with a template to produce a correlated signal indicating the presence of the timing reference in the received signal;
an integrator configured to produce an accumulated signal by overlaying one or more delayed versions of the accumulated signal onto the correlated signal, wherein the integrator is configured to delay the accumulated signals by integer multiples L of P, the integer multiples L being at least two; and
a timing detector configured to receive the accumulated signal from the integrator and to indicate timing acquisition or no timing acquisition based on determining a corroboration between:
a first plurality of peak values of the accumulated signal that are separated in time by L times P, and
a second plurality of peak values of the accumulated signals that are separated in time by integer multiples K of P, where K is an integer different than L, and K is not an integer multiple of L.

2. The apparatus of claim 1, wherein the integrator comprises a delay line having a single tap which delays the accumulated signal by the integer multiple of P.

3. The apparatus of claim 2, wherein the integer multiple is two.

4. The apparatus of claim 1, wherein the timing detector is configured to combine a plurality of peaks in the accumulated signal to produce a joint-decision metric.

5. The apparatus of claim 4, wherein the timing detector is configured to indicate timing acquisition in response to the magnitude of each peak in the joint-decision metric exceeding a dynamic threshold.

6. The apparatus of claim 4, wherein the timing detector is configured to indicate timing acquisition in response to a non-linear combination of the magnitudes of the peaks in the joint-decision metric exceeding a dynamic threshold.

7. The apparatus of claim 1, wherein the integrator comprises an IIR filter.

8. The apparatus of claim 1, wherein the integrator is configured to scale at least one of the delayed versions of the accumulated signal before overlaying onto the correlated signal, and to produce the accumulated signal for a predetermined initial period of time without decay before introducing a scaling operation.

9. The apparatus of claim 1, wherein the integrator comprises programmable coefficients.

10. A system comprising:
the apparatus of claim 1; and
a cell-search classification engine configured to respond to an indication of timing acquisition.

11. An apparatus for detecting a periodic timing reference in a received signal, the apparatus comprising:
a correlator configured to correlate the received signal with a template to produce a correlated signal indicating the presence of the periodic timing reference in the received signal;
an integrator configured to produce an accumulated signal by overlaying one or more delayed versions of the accumulated signal onto the correlated signal, wherein the integrator is configured to delay the accumulated signals by integer multiples L of a period of the periodic timing reference, the integer multiples L being at least two; and
a timing detector configured to receive the accumulated signal from the integrator and to indicate timing acquisition or no timing acquisition on the basis of a peak profile of the accumulated signal, wherein the timing detector is configured to separate peaks in the accumulated signal into a plurality of subsets S numbered 0 . . . L−1, wherein the peaks which form part of the S'th subset are at offsets (n*L+S)*P+K, where n and S are integers, P is the period of the periodic timing reference, and K is an unknown in the range [0 . . . P], to maintain a count of the number of peaks in each subset whose magnitude exceeds a magnitude threshold, and to indicate timing acquisition only in response to each of the counts exceeding a count threshold.

12. The apparatus of claim 11, wherein the integrator comprises a delay line having a single tap which delays the accumulated signal by the integer multiple of the period of the periodic timing reference.

13. The apparatus of claim 12, wherein the integer multiple is two.

14. The apparatus of claim 13, wherein the timing detector is configured to allocate to a first subset those peaks which occur at offsets corresponding to S=0, and to allocate to a second subset those peaks which occur at offsets corresponding to S=1.

15. A method of detecting a timing reference that occurs periodically in a received signal every P seconds, the method comprising:
correlating the received signal with a template to produce a correlated signal indicating the presence of the timing reference in the received signal;
producing an accumulated signal by overlaying one or more delayed versions of the accumulated signal onto the correlated signal, wherein the accumulated signals are delayed by integer multiples L of P, the integer multiples L being at least two; and
indicating timing acquisition or no timing acquisition based on determining a corroboration within the accumulated signal between:
a first plurality of peak values of the accumulated signal that are separated in time by L times P, and
a second plurality of peak values of the accumulated signals that are separated in time by integer multiples K of P, where K is an integer different than L, and K is not an integer multiple of L.

16. A non-transitory computer program product storing computer-executable instructions which, when executed by a processor, cause the processor to detect a timing reference that occurs periodically in a received signal every P seconds by:
correlating the received signal with a template to produce a correlated signal indicating the presence of the timing reference in the received signal;
producing an accumulated signal by overlaying one or more delayed versions of the accumulated signal onto the correlated signal, wherein the accumulated signals are delayed by integer multiples L of P, the integer multiples L being at least two; and
indicating timing acquisition or no timing acquisition based on determining a corroboration within the accumulated signal between:
a first plurality of peak values of the accumulated signal that are separated in time by L times P, and a second plurality of peak values of the accumulated signals that are separated in time by integer multiples K of P, where K is an integer different than L, and K is not an integer multiple of L.

17. The non-transitory computer program product of claim 16 wherein the computer-executable instructions, when executed by the processor, further cause the processor to receive the accumulated signal and to indicate timing acquisition or no timing acquisition on the basis of a peak profile of the accumulated signal by separating peaks in the accumulated signal into a plurality of subsets S numbered 0 . . . L−1, wherein the peaks which form part of the S'th subset are at offsets (n*L+S)*P+K, where n and S are integers, and K is an unknown in the range [0 . . . P], to maintain a count of the number of peaks in each subset whose magnitude exceeds a magnitude threshold, and to indicate timing acquisition only in response to each of the counts exceeding a count threshold.

18. The non-transitory computer program product of claim 17 wherein the computer-executable instructions, when executed by the processor, further cause the processor to produce the accumulated signal, at least in part, by using a delay line having a single tap which delays the accumulated signal by the integer multiple of P.

19. The non-transitory computer program product of claim 18 wherein the integer multiple is two.

* * * * *